United States Patent [19]

Ballato et al.

[11] Patent Number: 5,381,260
[45] Date of Patent: Jan. 10, 1995

[54] UNIAXIALLY STRAINED SEMICONDUCTOR MULTIPLE QUANTUM WELL DEVICE USING DIRECTION-DEPENDENT THERMAL EXPANSION COEFFICIENTS IN A HOST SUBSTRATE

[75] Inventors: Arthur Ballato, Oceanport; John A. Kosinski, Wall Township, Monmouth County; Mitra Dutta, Matawan; Hongen Shen, Howell; Yicheng Lu, Highland Park; Jagadeesh Pamulapati, Eatontown, all of N.J.

[73] Assignee: The United States of America as represented by the Secretary of the Army, Washington, D.C.

[21] Appl. No.: 154,901

[22] Filed: Nov. 19, 1993

[51] Int. Cl.⁶ .............................................. G02F 1/015
[52] U.S. Cl. .................................... 359/248; 257/14; 257/94; 359/245
[58] Field of Search ............... 359/237, 238, 245, 248, 359/276, 629; 257/14, 15, 18, 22, 94, 96, 97

[56] References Cited

U.S. PATENT DOCUMENTS

| | | | |
|---|---|---|---|
| 4,879,763 | 11/1989 | Wood | 359/168 |
| 5,107,307 | 4/1992 | Onose et al. | 257/15 X |
| 5,274,247 | 12/1993 | Dutta et al. | 359/248 X |

Primary Examiner—John D. Lee
Attorney, Agent, or Firm—Michael Zelenka; William H. Anderson

[57] ABSTRACT

The present invention is a spatial light modulator which uses an uniaxially strained multiple quantum well (MQW) structure with an anisotropic absorption to rotate the polarization of light normal to the MQW structure. The anisotropy which produces this rotation is the result of a thermally induced in-plane anisotropic strain. The MQW light modulator based on this process has a high contrast ratio of 7000:1 and increased speed as compared to other similar modulators.

4 Claims, 3 Drawing Sheets

UNIAXIALLY STRAINED SEMICONDUCTOR MULTIPLE QUANTUM WELL DEVICE USING DIRECTION-DEPENDENT THERMAL EXPANSION COEFFICIENTS IN A HOST SUBSTRATE

GOVERNMENT INTEREST

The invention described herein may be made, used, sold, and/or licensed by the Government of the United States of America without the payment to us of any royalties thereon.

FIELD OF THE INVENTION

The present invention relates to semiconductor heterostructure electro-optic devices and more particularly, to high speed, high contrast semiconductor spatial light modulators.

BACKGROUND OF THE INVENTION

Semiconductor multiple quantum well (MQW) modulators operating with incident light normal to the plane of the device are of considerable interest because they are the fundamental elements for spatial light modulators, and have the potential for being high speed, high dynamic range devices integrable with detector and control electronic circuits. Prior research on normal incidence multiple quantum well light modulators has concentrated on amplitude modulation, relying on a sufficient difference in the absorption coefficient between the on/off states at the operating wavelength to achieve useful contrasts. Such changes in the absorption coefficient have typically been effected by means of the quantum confined Stark effect (QCSE), Wannier Stark localization, or photoinduced excitonic absorption saturation. Unfortunately, thickness constraints due to growth considerations, coupled with the limitation that the maximum obtainable change in the excitonic absorption due to line broadening is $\sim 2 \times 10^{-1}$, prevents the contrast ratio in a normal incidence MQW light modulator from exceeding a value of $\sim 10:1$. This on/off ratio can be improved considerably by incorporation of the modulator structure within an asymmetric Fabry-Perot (ASFP) cavity which has a 100:1 contrast in a reflection electro-optic absorption modulator and a 27:1 contrast in an all-optical modulator. Conversely, optical modulators utilizing polarization rotation, such as liquid crystal and magneto-optic devices, have achieved significantly higher contrast ratios ($>10^4:1$), but they are hampered by poor high frequency performance.

SUMMARY OF THE INVENTION

Accordingly, one object of the invention is provide for an optic modulator which has a high contrast ratio and also may be operated at high speeds.

This and other objects are accomplished by the present invention which provides for a novel MQW light modulator based upon polarization rotation of incident light normal to a uniaxially strained MQW structure. The present invention exhibits an exceedingly high contrast ratio of 7000:1.

According to the present invention, a uniaxial strain is applied along the x (or y) direction to break the rotation symmetry of the valence band at $k_1=0$, thereby mixing the heavy and light hole bands in the MQW and creating an anisotropic excitonic absorption. This phenomenon, in conjunction with absorption changes produced by the QCSE (for electro-optic modulators) or nonlinear absorption saturation (for all-optical modulators), results in a tunable polarization rotation. The structure of the present invention includes a substrate, an adhesion layer disposed on the substrate, a multiple quantum well heterostructure bonded to the substrate and having a stoichiometry and configuration such that a splitting of heavy and light holes of quantum wells comprising the multiple quantum well heterostructure is smaller than a splitting of the heavy and light holes due to any uniaxial strain which is placed on the multiple quantum well heterostructure, a polarizing light beam splitter means disposed above the multiple quantum well structure, and means to apply an electric field to the multiple quantum well heterostructure, wherein an anisotropic strain is induced in the plane of the multiple quantum well heterostructure when the mulitple quantum well structure is heated to an elevated temperature to form a bond and then cooled.

BRIEF DESCRIPTION OF THE DRAWINGS

These and other features of the invention will be more readily understood in light of the following Detailed Description of the Invention and the attached Figures wherein:

FIG. 5a and 5b are graphs of the transmission of modulation as a function of photon energy wherein FIG. 5a is of the amplitude modulation only and FIG. 5b is of the modulation caused primarily by polarization rotation.

DETAILED DESCRIPTION OF THE INVENTION

Figure 1:
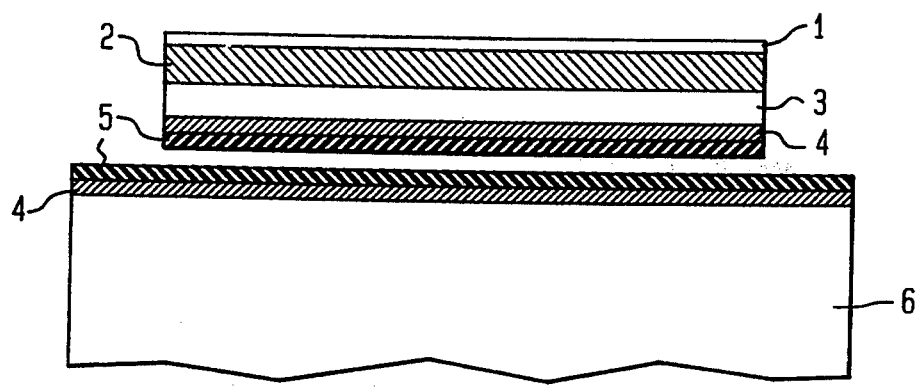
FIG. 1 is a cross-section of a semiconductor heterostructure according to the present invention.

According to the present invention, a material, such as $LiTaO_3$, which has a direction-dependent thermal expansion and which is chosen such that the thermal expansion of the material matches that of a semiconductor material, such as GaAs/AlGaAs, InGaAs/GaAs, etc., but which has a thermal expansion coefficient that is different from the thermal expansion of the semicondcutor material, is used as a substrate 6. Also according to the present invention, a semiconductor multiple quantum well (MQW) structure 2 is formed such that the quantum splitting of the heavy and light holes is smaller than the splitting from an in-plane anisotropic strain that will be placed on the structure 2 as described below. The semiconductor MQW structure 2 is mounted on the substrate by an adhesive 4 which can be either a layer of epoxy cement or an eutectic alloy. An example of such a material would a UV curing glue, such as Norland UV curable optical adhesive, Norland #81. The cement or the eutectic metal 4 will bond the substrate to the MQW structure at an elevated temperature and then by cooling the device down to room temperature, the desired anisotropic strain will be achieved in the MQW structure 2. With this anisotropic strain then, the exciton absorption of the MQW structure 2 will be likewise be anisotropic. In a preferred embodiment of the invention, a layer of Ti/Pt 5 is inserted to enhance the adhesion of the eutectic alloy and also to serve as a reflection mirror in the device.

Another way to form the device according to the present invention is to prestress a substrate material 6, such as GaAs or Si, to 5–10 kbar. Then, the MQW structure is bonded to the substrate using the same type of adhesive as described above. After bonding the device, the prestress on the substrate is removed, thereby transferring an anisotropic strain to the MQW structure through the adhesion layer 4.

Two examples of the device anticipated by the present invention are p-i(MQW)-n structures grown on (100) GaAs; these are described more specifically as follows. For the first example, the i region consists of approximately 100 periods of 100Å GaAs/60Å $Al_{0.2}Ga_{0.8}As$ MQWs, and for the second example, the i region consists of approximately 100 periods of 150Å GaAs/50Å $Al_{0.1}Ga_{0.9}As$ MQWS. A 500Å AlAs sacrifice layer 3, which is used for epitaxial lift-off, is grown below the active layer. The lift-off thin film is then bonded at temperature $T_o$ to the LiTaO3 substrate which has a direction-dependent thermal expansion coefficient and is cut as described above. In these examples, the substrate is cut to have a room temperature thermal expansion coefficient $\alpha_{33}$ which matches that of the MQW, or $6.15\times10^{-6}/C°$, while its orthogonal counterpart, $\alpha_{11}$, or $16.2\times10^{-6}/C°$, is different from the thermal expansion coefficient of the MQW structure, $\alpha_0$. Therefore, at a temperature $T\neq T_o$ ($T_o$ equals room temperature), a thermally induced in-plane anisotropic strain of $$\epsilon_{xx}(T) = \int_{T_o}^{T} [\alpha_{11}(T) - \alpha_0(T)]dT$$

can be produced.

Figure 2:
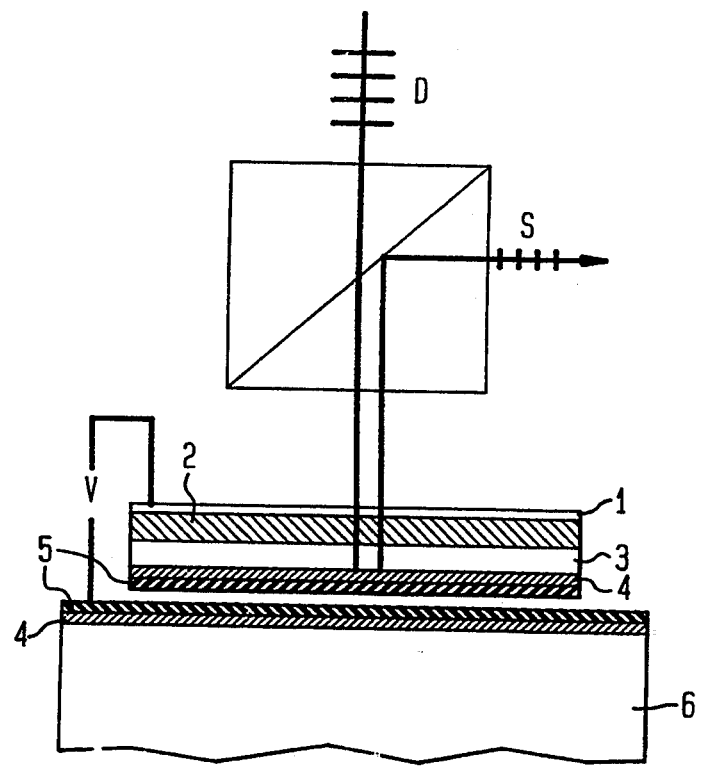
FIG. 2 is a cross-section/plan view of a working configuration of a device according to the present invention.

The present invention formed as spatial light modulator is shown in FIG. 2. Here, the spatial light modulator is operated in a reflection configuration with a polarizing beam splitter cube. As depicted in FIG. 2 by a straight line, incident light on the device is p polarized by the polarizing beam splitter cube. Therefore, when a voltage is applied across the device by coupling a voltage source across the device via electrode 1 (shown in FIGS. 1 and 2), for example, the excition absorption is quenched due to the quantum confined Stark effect and the polarization of the light is unchanged. Since the p polarized light cannot be reflected by the polarizing beam splitter cube, the device is in its off state. However, with no voltage bias applied, the anisotropic absorption in the uniaxially strained MQW structure rotates the polarization to an s polarization. Therefore, when the light is reflected back to the polarizing beam splitter cube, it is reflected out of the cube as shown. With this configuration, the contrast ratio of the device is enhanced by the beam splitter cube and therefore, the speed of the device can be as fast as several picoseconds.

Figure 4:
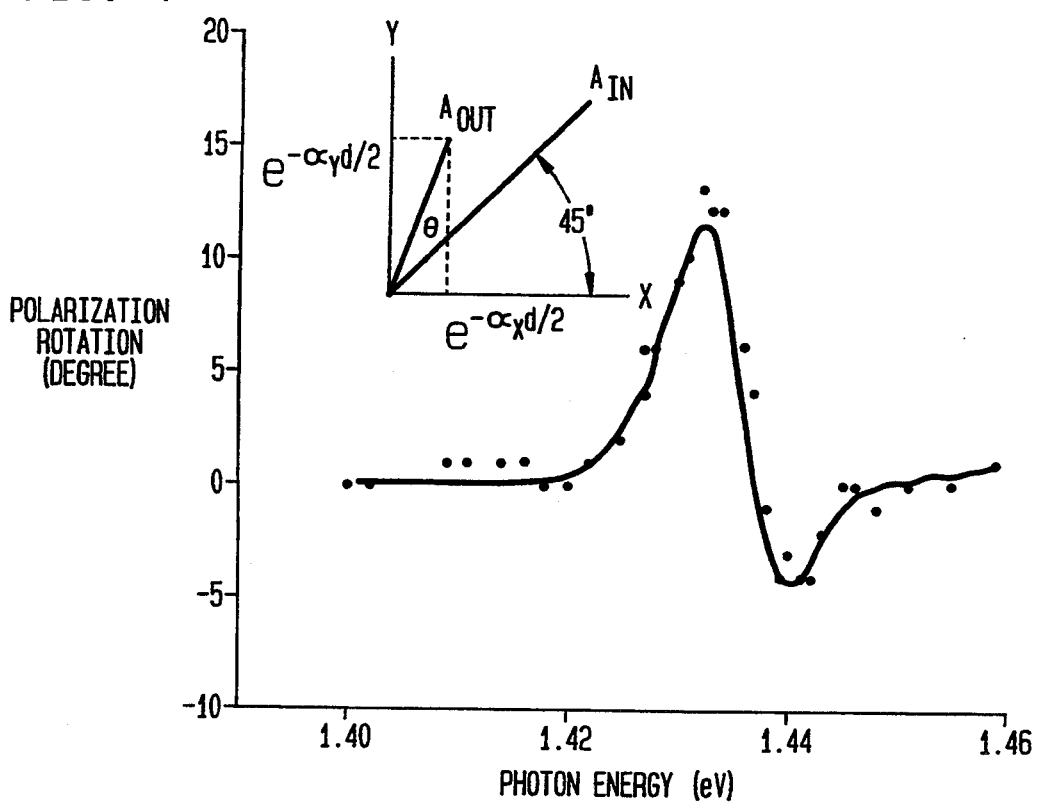
FIG. 4 is a graph of the room temperature polarization rotation angle of a device according to the present invention, the rotation angle being a function of photon energy.
Figure 5A:
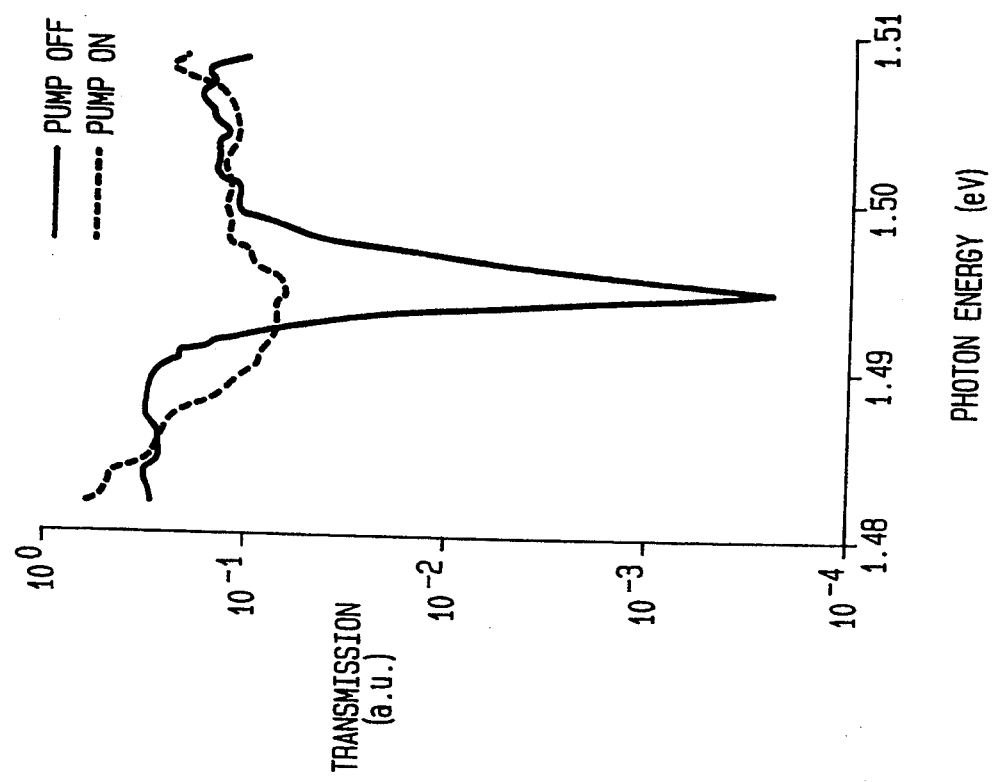
Figure 5B:
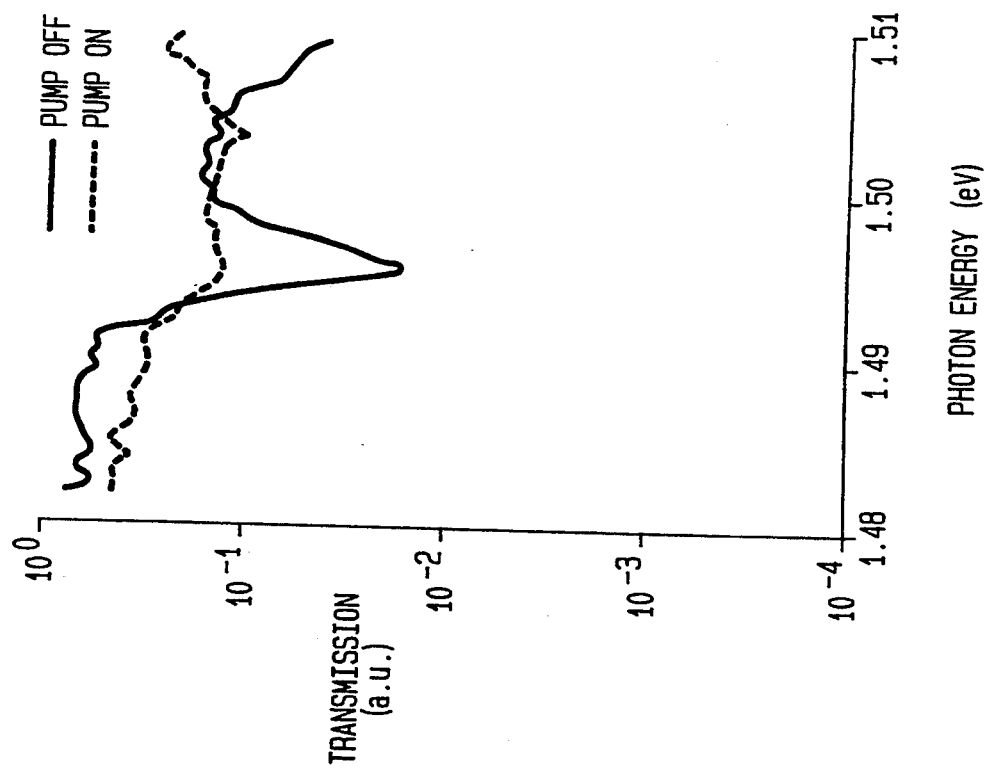

Since the rotation is due to anisotropic absorption at the exciton peak, it can be modulated by applying a voltage to the p-i(MQW)-n structure or a quantum confined Stark effect (QCSE) structure, as shown in FIG. 2, or by optically addressing the device through photoinduced absorption saturation (not shown). FIG. 5a shows the transmission of a 200 fs probe pulse of the first example at 200K as a function of photon energy near the heavy hole exciton peak. The probe and gating pulses were derived from an Ar+pumped self-mode-locked Ti-sapphire laser, and the polarization geometry was the same as shown in the inset of FIG. 4. Bleaching of the anisotropic excitonic absorption was achieved through photoexcitation of the sample by the gating pulse. Because most of the carriers created do not leave the wells in this example within the 12 ns period of our laser pulses, an absorption saturation due to a quasi-steady state buildup of carriers existed, and the temporal relation between the probe and gating pulses became unimportant. The solid line in FIG. 5(a) represents the off-state of the modulator when the gating pulse was absent. The dashed line shows the on-state in the presence of the gating pulse. For the results shown in FIG. 5(a), no advantage due to polarization rotation was achieved; therefore, the transmission exhibited simple amplitude modulation. In this case, the contrast ratio was 8:1 at E=1.496 eV. Therefore, to enhance the contrast ratio, a polarizer with an orientation perpendicular to the polarization of the transmitted beam in the absence of the gating pulse was inserted in the beam path, thereby significantly reducing the transmitted light in the offstate as shown in FIG. 5(b). While in the on-state, bleaching of the anisotropic excitonic absorption resulted in an increase in transmission of the probe pulse due to the rotation of its polarization. Because the intensity of the light in the off-state was greatly attenuated, a very high contrast ratio of 330:1 was achieved. It cannot be over emphasized that the modulation mechanism in this case was primarily polarization rotation rather than amplitude modulation. For a photoinduced polarization rotation $\Delta\theta\sim 25°$ an enhancement in contrast ratio of more than 40 was observed relative to the case in FIG. 5(a) for which the effect of the polarizer was absent. For the second example with a small $\Delta\theta\sim 12°$, the rotation-enhanced contrast ratio was more than 5 times larger than that found for the simple absorption case.

Figure 3:
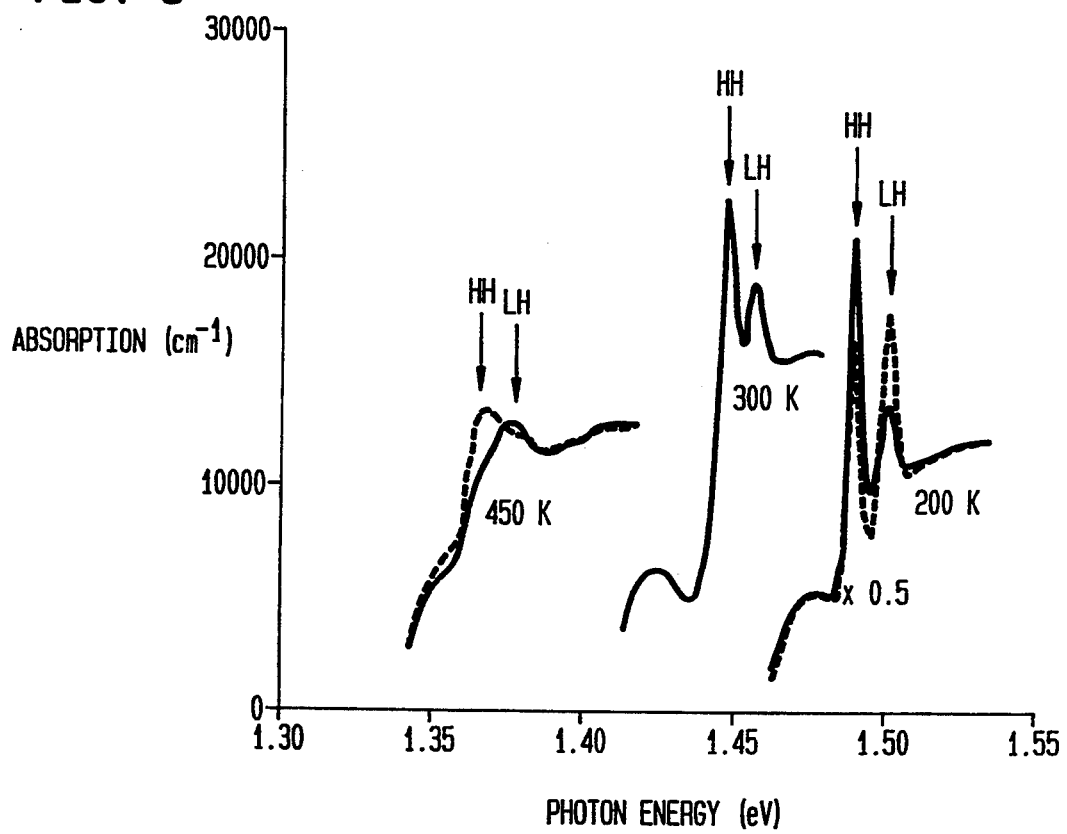
FIG. 3 is a graph of the absorption spectrum of a device according to the present invention wherein the solid lines and dashed lines represent absorption of light polarized in parallel and perpendicular directions, respectively.

The relation of polarization to temperature in the present invention is shown in FIG. 3 wherein the absorption spectrum at T=400, 300, and 200K of the first example, which was bonded at room temperature to the substrate, is graphed. The solid (dashed) line represents the absorption of light polarized along the x(y) direction, and the peaks labeled 11H and 11L represent the heavy and light hole exciton transitions, respectively. At $T=T_o=300K$, the absorption was isotropic, while at $T\neq T_o$ the absorption $\alpha_{11}$ was significantly different from $\alpha_{33}$ near the exciton peaks. This observation, therefore, indicated the presence of an anisotropy in absorption $\Delta\alpha=\alpha_{11}-\alpha_{33}$ due to a thermally induced uniaxial strain. To compare experimental result with theory, a calculation, in which the effect of strain has been treated as a small perturbation of the Luttinger-Kohn Hamiltonian for the unstressed MQW structure, was performed. From this calculation, it was found that for T=200K $\Delta\alpha/\alpha_{avc}=0.27$ and $-0.78$ for heavy and light hole excitonic absorption, respectively; this is in good agreement with the experiment values of 0.3 and $-0.7$. From the sign of $\Delta\alpha$, it shown that MQW is under compressive stress for $T<T_o$, and tensile stress for $T>T_o$.

Further, the room temperature polarization rotation, in the second example, which was bonded to the substrate at an elevated temperature (375K), was measured directly. For this measurement, the incident light was polarized at 45° with the x and y axes as shown in the insert of FIG. 4. The polarization of the transmitted light was rotated by an angle of $$\theta = \arctan\left[\exp\left(\frac{\Delta\alpha d}{2}\right)\right] - 45°$$

where d is the thickness of the i(MQW) layer. This analysis assumes that the phase difference induced by $\Delta n$ in the MQW structure is negligible. To separate this phase difference from that produced by the LiTaO$_3$ substrate, an orthogonally oriented identical piece of LiTaO$_3$ was placed against the substrate, resulting in a cancellation of the substrate-induced phase difference. A Soleil-Babinet phase compensator and polarizer were then used to analyze the transmitted light. FIG. 4 shows the measured rotation angles as a function of photon energy. As can be readily seen, these measurements are in good agreement with The ones (solid line) calculated from the second equation using the $\Delta\alpha$ measured in the second example. The phase difference due to the MQW is smaller than 1/20λ in the second example at room temperature. This equates to a maximum room temperature polarization rotation in this example of $\Delta\theta \parallel 12°$. In the first example, $\Delta\theta \sim \pm 25°$ was measured at 200K for the heavy and light hole exciton peaks, respectively.

Although the present invention has only been described as an optically addressed light modulator, the concept of polarization rotation can be used to improve the contrast ratio of normal incidence electro-optic MQW light modulators. In addition, the device presented can be incorporated easily into a modified ASFP cavity, thereby further enhancing the contrast ratio. Creation of a controllable in-plane uniaxial strain may have many other applications. For example, when the strain in the MQW is along an axis other than (100) a piezoelectric field is generated which has been predicted to create larger nonlinear optical properties; mixing of heavy and light hole bands at $k_I=0$ may enhance the valence intersubband transitions and improve the sensitivity of p-type MQW infrared detectors operating at normal incidence.

What is claimed is:

1. An optical modulator comprising:
   a substrate;
   an adhesion layer disposed on the substrate;
   a multiple quantum well heterostructure bonded to the substrate and having a stoichiometry and configuration such that a splitting of heavy and light holes of quantum wells comprising the multiple quantum well heterostructure is smaller than a splitting of the heavy and light holes due to any uniaxial strain which is placed on the multiple quantum well heterostructure;
   a polarizing light beam splitter means disposed above the multiple quantum well structure; and
   means to apply an electric field to the multiple quantum well heterostructure;
   wherein an anisotropic strain is induced in the plane of the multiple quantum well heterostructure when the mulitple quantum well structure is heated to an elevated temperature to form a bond and then cooled.

2. A spatial light modulator comprising:
   a substrate having a direction-dependent thermal expansion;
   a multiple quantum well heterostructure which is configured such that a splitting of heavy and light holes of quantum wells comprising the multiple quantum well heterostructure is smaller than a splitting of the heavy and light holes due to any anisotropic strain which is placed on the multiple quantum well heterostructure, the multiple quantum well structure being formed of a semiconductor material which has a thermal expansion that matches the thermal expansion of the substrate and which has a thermal expansion coefficient that is different from the thermal expansion of the substrate;
   an adhesion layer disposed on the substrate and multiple quantum well heterostructure;
   a eutectic alloy deposited on the adhesion layer on the substrate and the multiple quantum well heterostructure, the eutectic alloy being sandwiched by the substrate and the multiple quantum well, wherein the eutectic alloy is heated to its eutectic temperature and then cooled to room temperature thereby placing an anisotropic stress on the multiple quantum well structure;
   a polarizing light beam splitter means disposed above the multiple quantum well structure; and
   means to apply an electric field to the multiple quantum well structure.

3. A spatial light modulator comprising:
   a multiple quantum well heterostructure which is configured such that a splitting of heavy and light holes of quantum wells comprising the multiple quantum well heterostructure is smaller than a splitting of the heavy and light holes due to any uniaxial strain which is placed on the multiple quantum well heterostructure;
   a pre-stressed substrate;
   an adhesion layer disposed on the substrate and multiple quantum well heterostructure;
   a eutectic alloy deposited on the adhesion layer on the substrate and the multiple quantum well heterostructure, the eutectic alloy being sandwiched by the substrate and the multiple quantum well;
   a polarizing light beam splitter means disposed above the multiple quantum well structure; and
   means to apply an electric field to the multiple quantum well structure
   wherein the eutectic alloy is heated to its eutectic temperature and then cooled to room temperature and the stress is removed from the pre-stressed substrate thereby placing an anisotropic stress on the multiple quantum well structure.

4. A method of fabricating a spatial light modulator comprising the steps of:
   forming a substrate;
   applying an adhesion material to the substrate;
   depositing a eutectic alloy layer on the adhesion material;
   forming a multiple quantum well heterostructure such that a splitting of heavy and light holes of quantum wells comprising the multiple quantum well heterostructure is smaller than a splitting of the heavy and light holes due to any anisotropic strain which is placed on the multiple quantum well heterostructure;
   applying an adhesion material to the substrate;

depositing a eutectic alloy layer on the adhesion material of the multiple quantum well structure;

placing the substrate and multiple quantum well structure together with the eutectic alloy layers contacting each other;

heating the eutectic alloy layers to a eutectic temperature;

cooling the modulator to room temperature, wherein cooling the modulator to room temperature generates an anisotropic stress on the multiple quantum well structure; and placing a light beam splitter above the multiple quantum well structure; and forming a means to apply an electric field to the multiple quantum well structure.

* * * * *